May 19, 1925.
D. C. COLLIER
1,538,270
METHOD FOR AGITATING, WASHING, AND DRYING
Filed Jan. 15, 1921
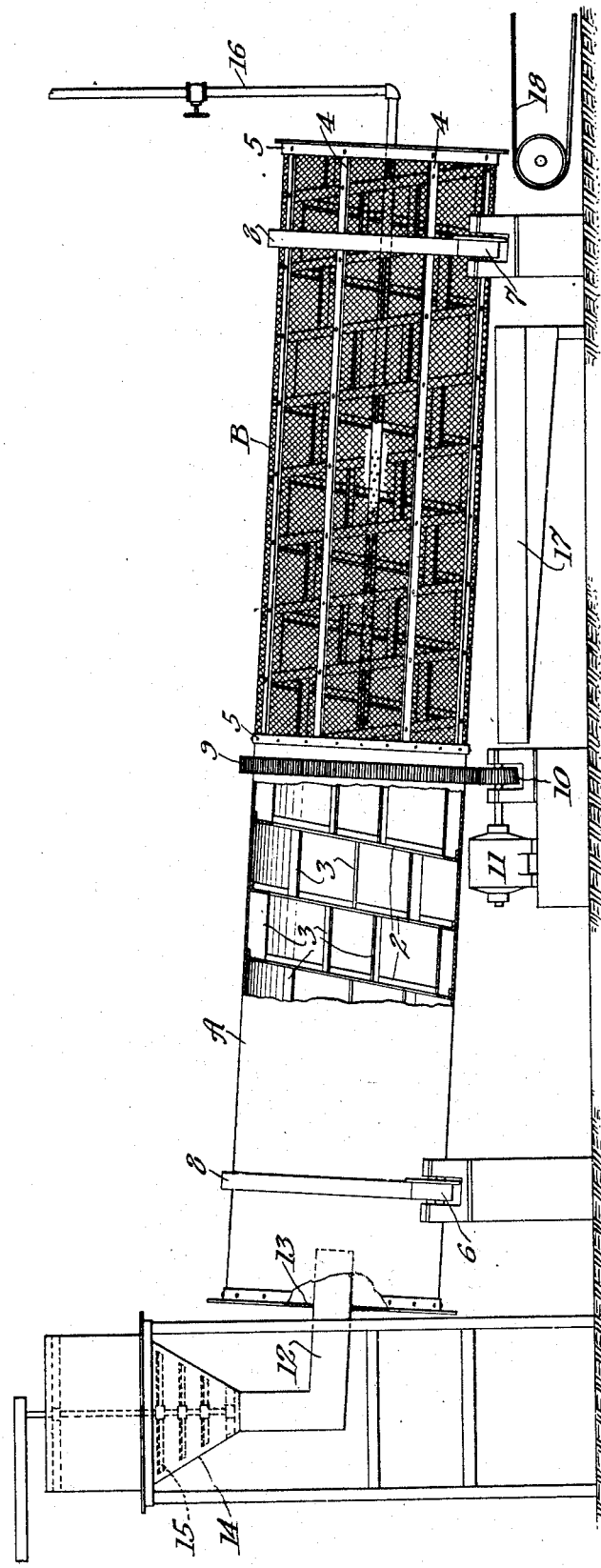

Patented May 19, 1925.

1,538,270

UNITED STATES PATENT OFFICE.

DAVID C. COLLIER, OF SANTA FE, NEW MEXICO.

METHOD FOR AGITATING, WASHING, AND DRYING.

Application filed January 15, 1921. Serial No. 437,570.

*To all whom it may concern:*

Be it known that I, DAVID C. COLLIER, a citizen of the United States, residing at Santa Fe, in the county of Sante Fe and State of New Mexico, have invented certain new and useful Improvements in Methods for Agitating, Washing, and Drying, of which the following is a specification.

This invention relates to a method for bringing materials into contact with each other by agitation produced by continuously and successively dropping portions of such materials into other portions or masses of such materials.

It also relates to a method for washing the agitated or mixed materials to remove therefrom such portions as can be removed by a flow of water; and also to remove excess water after the washing.

The invention is particularly adapted for the treatment of mixtures of pulverized coal, oil and water, in which by agitation the oil and carbonaceous particles are agglomerated or aggregated, while the non-combustible or ash-forming ingredients are removed by washing.

The invention will be readily understood from the accompanying drawing in which is shown a tubular structure mounted to rotate. This structure comprises an imperforate shell A, having on its interior a spiral rib 2. Between the portions of the spiral rib are arranged a series of flights or shelves 3.

Attached to or forming a continuation of this imperforate drum, is a perforated drum portion B whose shell is preferably made of wire mesh, supported on ribs 4, 4, secured to rings 5, 5. The spiral rib and flights are continued to the end of the perforated drum portion.

The entire drum is mounted on end bearings 6, 7, on which rest bands 8, 8, the drum being rotated by a gear 9, and pinion 10, which is driven by a motor 11.

Material is fed into the drum through a feed tube 12, passing through a centrally arranged opening in the head 13 of the drum. A hopper 14, is provided with a rotatable stirrer 15, and, delivers the mixed material into the pipe 12.

A water pipe 16, extends into the perforated portion of the drum, and is provided with openings or jets, for a portion only of its length, as shown by the broken away portion of the wire-screen shell.

A launder 17 may be provided to receive the material washed out from that portion of the drum to which water is supplied; and an endless belt or other conveyer will serve to remove the agglomerated material delivered from the open lower end of the drum.

The operation of the device is as follows:

The material to be operated on, preferably finely ground, is charged into the hopper 14, and is there mixed with a liquid comprising a constituent having the property of selectively agglomerating particles of one constituent of the material to be separated. A liquid particularly suitable for the purposes of the invention is oil, or preferably oil and water. From the hopper it flows into the drum portion A. It is carried up on the ascending side of the drum by the flights or shelves 3, from which it drops back to the bottom of the drum. At the same time it is gradually progressed axially along the drum.

I have found that this successive dropping, which brings portions of the mixture into impacting contact with each other and thereby effects amalgamation or agglomeration of the carbonaceous particles to a much greater extent than stirring or other like modes of agitation.

If the material being operated upon is a mixture of fine coal, oil and water, the result is a practically complete amalgamation or association of the carbonaceous material and the oil, the non-combustible or mineral ash-forming ingredients remaining in mixture with or suspension in the water.

As the material progresses into the drum portion B, where it is sprayed with water from the perforated pipe, it is subjected to washing and continued agitation, the water and non-combustible material flowing out through the perforations of the screen, which is made of such mesh that the amalgamated or agglomerated granules or masses can not pass through. The material still under agitation then progresses into the end section of the drum, to which no water is supplied. In this section, the separated water is drained off, so that the granules or agglomerates pass out of the drum substantially free from water, and are ready for subsequent utilization.

In the drum portion, in which the action of dropping portions of the material upon other portions is continued, the agglomerated carbonaceous material is presented to the action of the wash liquid in compact form on the bottom of the screen. The spray merely acts upon the top of the material and carries off the unagglomerated particles which have not been drained off with the liquid in the portion of the drum B adjacent the drum A.

I am thus enabled to successively and continuously mix, wash and dry materials in a single apparatus.

My invention is not limited to any particular dimensions, arrangement or construction of the parts shown, as these may be varied to meet the exigencies of each particular case. For example, the pitch of the spiral, the number of flights, the speed of rotation of the drum, are all factors which can readily be determined by the character of the material being operated upon.

I claim:—

1. The method of separating constituents of a pulverulent material, which consists in mixing the material with a liquid comprising a constituent having the property of selectively agglomerating particles of one of said constituents and then repeatedly bringing portions of the mixture into impacting contact with each other to promote agglomeration and removing the particles of another constituent together with the residual liquid.

2. The method of separating constituents of a pulverulent material, which consists in mixing the material with a liquid comprising a constituent having the property of selectively agglomerating particles of one of said constituents, then repeatedly bringing portions of the mixture into impacting contact with each other to promote agglomeration and then removing the particles of another constituent together with the residual liquid.

3. In the art of separating constituents of a pulverulent material, the mode of operation which consists in mixing the material with a liquid comprising a constituent having the property of selectively agglomerating particles of one of said constituents, then delivering the mixture upon a support and repeatedly bringing portions of the mixture into impacting contact with each other upon the support.

4. In the art of separating constituents of a pulverulent material, the mode of operation which consists in mixing the material with a liquid comprising a constituent having the property of selectively agglomerating particles of one of said constituents, then delivering the mixture upon an impervious support, repeatedly bringing portions of the mixture into impacting contact with each other upon the support and then removing another of said constituents together with the liquid.

5. In the art of separating constituents of a pulverulent material, the mode of operation which consists in mixing the material with a liquid comprising a constituent having the property of selectively agglomerating particles of one of said constituents, then delivering the mixture upon an impervious support, repeatedly bringing portions of the mixture into impacting contact with each other upon the support, then delivering the mixture upon a screen and then repeatedly bringing portions of the mixture into impacting contact with each other upon the screen.

6. In the art of separating constituents of a pulverulent material, the mode of operation which consists in mixing the material with a liquid comprising a constituent having the property of selectively agglomerating particles of one of said constituents, then delivering the mixture upon an impervious support, repeatedly bringing portions of the mixture into impacting contact with each other upon the support, then delivering the mixture upon a screen and repeatedly bringing portions of the mixture into impacting contact with each other upon the screen and simultaneously applying a wash liquid.

In testimony whereof, I affix my signature.

DAVID C. COLLIER.